US006989359B2

(12) United States Patent
Weir

(10) Patent No.: US 6,989,359 B2
(45) Date of Patent: Jan. 24, 2006

(54) ENVIRONMENTAL WIPE SOLVENT COMPOSITIONS AND PROCESSES

(75) Inventor: John Douglas Weir, Huntington, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 215 days.

(21) Appl. No.: 10/681,064

(22) Filed: Oct. 8, 2003

(65) Prior Publication Data

US 2005/0079989 A1 Apr. 14, 2005

(51) Int. Cl.
*C11D 3/18* (2006.01)
*C09D 9/00* (2006.01)
*C23G 5/02* (2006.01)

(52) U.S. Cl. ...................... 510/200; 510/201; 510/202; 510/203; 510/255; 510/401; 510/466; 427/387

(58) Field of Classification Search ................ 510/200, 510/201, 202, 203, 255, 401, 466; 427/387
See application file for complete search history.

(56) References Cited

U.S. PATENT DOCUMENTS 4,544,413 A 10/1985 Boots et al.
4,673,354 A * 6/1987 Culler ..................... 433/217.1
5,015,506 A 5/1991 Purcell
5,633,038 A * 5/1997 Ruschau ..................... 427/239
5,869,140 A * 2/1999 Blohowiak et al. ......... 427/307
6,025,313 A * 2/2000 Weir .......................... 510/201
6,096,700 A * 8/2000 Weir et al. .................. 510/245
6,248,403 B1 * 6/2001 Weir et al. .................. 427/327
6,540,844 B1 * 4/2003 Crook ........................ 148/243
6,596,835 B1 * 7/2003 Brown et al. ................. 528/34
6,734,250 B2 * 5/2004 Azechi et al. .............. 524/588
6,827,810 B2 * 12/2004 Sauer ...................... 156/272.8

* cited by examiner

*Primary Examiner*—Gregory Webb
(74) *Attorney, Agent, or Firm*—Perman & Green, LLP.

(57) ABSTRACT

Silane type polyfunctional coupling agents and adhesion promoters are added to major amounts by volume of environmentally-safe organic wipe solvents generally having a low vapor pressure to form novel wipe solvent compositions for cleaning and priming the surface of a substrate such as that of metal, composite, glass, plastic or other material prior to the application of coatings of paint, adhesive and/or similar layers and/or prior to the lamination of such substrates to each other or to support structures such as honeycomb bodies, while simultaneously depositing and bonding the coupling agent and adhesion promoter to the cleaned surface of the substrate.

9 Claims, No Drawings

ENVIRONMENTAL WIPE SOLVENT COMPOSITIONS AND PROCESSES

BACKGROUND OF THE INVENTION

1. Field of the Invention

The present invention relates to wipe solvent-primer compositions for application to various substrates, including bare metal, metal having a surface finish/coating such as anodized, Alodined, deoxidized, or abraded metals, fiberglass, plastic films, organic coatings, composites, glass and other substrates, for purposes of cleaning and priming the substrate surface to improve the receptivity and bonding properties of the substrate relative to organic coatings, adhesives, adhesive coatings, sealants, paints, honeycomb structures and similar materials conventionally bonded to such substrates.

2. State of the Art

It is known to improve the receptivity of substrates for paints, primers and adhesive layers by treating the substrate surface with mechanical abrasive operations such as blasting followed by cleaning with an organic solvent such as methyl ethyl ketone followed by brush-coating with a dilute aqueous silane solution and drying. Reference is made to U.S. Pat. No. 5,312,520 to Chung, dated May 17, 1994, and entitled "Method of metallic surface preparation utilizing silane for adhesive bonding" The process according to this patent is objectionable because methyl ethyl ketone is a hazardous air pollutant, dangerous to worker safety, and the process requires three separate steps, with the silane brushing step being repeated three times using alternating brush strokes.

Reference is made U.S. Pat. No. 5,424,133 to Eckhardt, et al., dated Jun. 13, 1995, and entitled "Process for the preparation of substrate surfaces for adhesive bonding" for its disclosure of a process for preparing a plastic film or composite substrate surface for adhesive bonding coating operations by applying to the surface an abrasive composition containing abrasive particles such as silicon-containing particles and rubbing the coating into the surface to fix the abrasive particles thereto. The surface is first degreased by wiping with a solvent such as isopropanol.

It is known to treat or coat aluminum and other substrates to improve their bonding properties relative to primers, paints, adhesive coatings and other substrates such as composites, metals, glass, etc. Such process typically requires the use of a chemical conversion coating (CCC), such as Alodine, over the aluminum surface to improve the bonding properties of the substrate for paints, adhesives, etc., while enhancing the corrosion resistance of the coating system. The chemical conversion coating composition typically contains chromic acid, a fluoride acid salt and accelerators.

Chromium is an environmentally-objectionable chemical targeted by the EPA for reduction or elimination, and the replacement of chromium-containing plating and treatment baths with non-chromated baths has been the subject of extensive academic and industrial research.

Alternative chromium-free coating compositions have been developed but the process of applying such compositions requires multiple steps, each of which usually requires a different heated process tank as opposed to the single heated process tank required for the conventional chromated chemical conversion coating (CCC) process. The energy and facility requirements of this alternative process create substantial difficulty and expense from the standpoint of implementation into a production facility.

Another alternate chemical conversion process involves the use of a cobalt-amine oxidizing composition such as Alodine 2000 to form a chemical oxide film on aluminum substrates. Such process requires the use of two separate heated process tanks. In the first step a chemical oxide layer is formed on the surface of the aluminum using a cobalt-amine oxidizing bath to form an oxide layer about 1000 angstrom units in thickness. In the second step the oxidized aluminum substrate is immersed in a second tank containing a composition which seals the oxide layer to impart corrosion resistance to the substrate. The first step increases the bonding properties of the aluminum substrate while the second step is required to impart corrosion resistance.

Presently, when a silicone composition is applied to various substrates, it is often necessary to use a primer; that is, a primer is applied on the surface of the substrate and then the silicone composition is applied thereover and cured onto the substrate. In many cases, if a silicone composition is applied to a substrate without a primer, the bond between the silicone and the substrate is not as strong as would be desired.

Application of a primer entails an additional step in the preparation of the substrate and thus is costly as well as time consuming. Therefore, it would be desirable to provide silicone compositions which do not require a primer to be applied to the surface of the substrate.

The use of silylfumarate and silylmaleate compounds as adhesion promoters in silicone compositions is known in the art. De Zuba et al., U.S. Pat. No. 3,941,741 discloses the use of a maleate, fumarate, silylmaleate, or silylfumarate compound as a self-bonding additive in a heat-curable silicone rubber composition. U.S. Pat. No. 4,273,698 to Smith, Jr., et al., dated Jun. 16, 1981 and entitled "Self-bonding room temperature vulcanizable silicone rubber compositions"; U.S. Pat. No. 4,308,372 to Smith, Jr., et al., dated Dec. 29, 1981 and entitled "Shelf-stable one-part room temperature vulcanizable silicone rubber composition" and U.S. Pat. No. 4,395,507 to Dziark, et al., dated Jul. 26, 1983 and entitled "Self-bonding one-component dimedone RTV silicone rubber compositions" disclose the use of a silyl maleate, a silyl fumarate, or a silyl succinate as an adhesion promoter in room temperature curable silicone compositions.

The use of silylfumarate and silylmaleate compounds as adhesion promoters in addition-curable silicone compositions is also known in the art. [U.S. Pat. No. 4,891,407 to Mitchell, dated Jan. 2, 1990 and entitled "Interpenetrating polymeric networks comprising polytetrafluoroethylene and polysiloxane": U.S. Pat. No. 5,164,461, to Mitchell, et al., dated Nov. 17, 1992 and entitled "Addition-curable silicone adhesive compositions").

Alkanolamines incorporated with aminosilanes into surface films have been discovered to provide exceptional levels of adhesive performance when overcoated with any of a variety of paints and polymers. [U.S. Pat. No. 6,020,028 to Kinneberg, dated Feb. 1, 2000 and entitled "Silane adhesion catalysts"] That method involves applying a solution of an aminosilane and an alkanolamine, dissolved in a solvent, to a substrate and thereafter contacting the coated substrate surface with uncured paint or fluid polymer and allowing the uncured paint or fluid polymer to cure.

U.S. Pat. No. 6,096,700 to Weir, et al. dated Aug. 1, 2000 and entitled "Environmental wipe solvent compositions and processes", discloses a wipe solvent use containing compositions of an environmentally safe volatile organic solvent and a minor volume of a poly-functional coupling agent, preferably of the silane type.

Recently work has been done [U.S. Pat. No. 6,004,679 to Mitchell, et al. dated Dec. 21, 1999 and entitled "Laminates containing addition-curable silicone adhesive compositions"] on a process to add an adhesion promoter directly to silicone coating materials for added adhesion to substrates. Clearly, it is highly desirable to provide a process, which eliminates the need for chemical conversion steps which require the use of chromium or require the use of several heated baths and several steps to enhance adhesion properties to the substrate.

Such processes are tedious, time-consuming, cost-ineffective and/or dangerous, and are unsatisfactory for use on certain substrates, where abrasion or blasting cannot be used, and are ineffective for certain coatings and bonding operations.

Therefore, it is an object of this invention to provide a process for preparing a substrate with enhanced adhesion properties.

It is an object of this invention to provide a process for preparing a substrate with enhanced adhesion properties while eliminating a process step in preparing the substrate.

It is an object to provide a process for preparing a substrate with enhanced adhesion properties without requiring the use of noxious, hazardous or environmentally unfriendly substances.

SUMMARY OF THE INVENTION

The novel process of the present invention involves the addition of silane type polyfunctional coupling agents and adhesion promoters to major amounts by volume of environmentally-safe organic wipe solvents generally having a low vapor pressure to form novel wipe solvent compositions for cleaning and priming the surface of a substrate such as metal, composite, glass, plastic or other material prior to the application of coatings of paint, adhesive and/or similar layers and/or prior to the lamination of such substrates to each other or to support structures such as honeycomb bodies, while simultaneously depositing and bonding the coupling agent and adhesion promoter to the cleaned surface of the substrate.

The invention replaces the need to apply a silicone primer to the substrate after cleaning the substrate and prior to bonding. It also replaces the need to add the adhesion promoter directly to the silicone formulation at increased cost to the formulators and user community. With the case where the silicone adhesion promoter is added directly to the silicone composition, the substrate still has to be cleaned prior to bonding. In any event the substrate has to be cleaned, prior to bonding.

The novel process and composition when used as a cleaner with the adhesion promoter already in the cleaning formulation will both simultaneously clean and treat the substrate with the adhesion promoter. This process will eliminate either a cleaning step or the need to add the adhesion promoter directly to the material. Since cleaning of the substrate generally is always required for optimum adhesion, this novel method and associated solvent formulations is a preferred alternative to compositions and processes presently used.

DETAILED DESCRIPTION

The disclosed process avoids the use of environmentally-objectionable volatile organic solvents which are dangerous to the environment and to the health of workers, eliminates the need for separate cleaning steps and coating agent-application steps, and eliminates the need for conventional chemical conversion or oxidation coating steps on metal substrates such as aluminum, enabling the direct application and bonding of corrosion-resisting coatings such as paints, adhesive resin layers, sealant layers, etc., to the substrate to impart corrosion resistance thereto, while coupling the coating directly to the substrate to avoid peeling, flaking or other separation of the coating and top coatings or laminates from the substrate.

The present process applies the coupling agent and adhesion promoter directly to the area of the substrate to be coated, and eliminates the need for the coupling agent to migrate through a resin matrix to couple to the substrate as in the case where the coupling agent is present in an after-applied resinous paint, adhesive or other layer, such as of curable epoxy resin or curable polyurethane resins from polyester resins and isocyanate curing agents.

The present novel surface treatment wipe solvent compositions comprise dilute solutions of one or more polyfunctional coupling agent(s) and one or more adhesion promoters in one or more environmentally-safe volatile organic solvents.

The present wipe solvent compositions contain from about 0.1% to about 5% by volume of the coupling agent and from about 0.1 to about 5% by volume of the adhesion promoter with the remainder being solvent.

Preferred volatile organic solvents include naphtha, methyl propyl ketone, acetone, isopropyl alcohol and commercially available solvents and blends such as a 50/50 mixture of methyl propyl ketone and aliphatic naphtha, a 50/50 mixture of isopropyl alcohol and aliphatic naphtha, a 60/40 mixture of methyl ethyl ketone/methyl isobutyl ketone, Citro Safe, Shell Tolu-Sol.RTM. WHT, (mixed aliphatic ($C_7$–$C_8$ cycloparafins] solvents), and mixtures or blends or these or other environmentally and/or legally acceptable solvents.

Suitable silane-type polyfunctional coupling agents include silane coupling agents listed in Dow Corning Bulletin Form No. 23-012C-90. A preferred silane additive to the present wipe compositions comprises a 0.1 to 5% solution of hydroxyl- or lower alkoxy-terminated silane compound, such as 3-glycidoxy-propyltrimethoxy silane which is commercially-available under the trade designation Dow Corning Z-6040. This is an organofunctional silane which hydrolyzes to form silanol groups capable of bonding with inorganic surfaces such as metal and having an affinity for organic coatings applied thereover. Also suitable is a composition available under the trademark Rain-X.RTM. which is a 9% solution of a mixture of siloxane silanes in water-miscible alcohols, essentially ethyl alcohol, as well as aminoalkoxy silane reaction products.

Suitable adhesion promoters are adhesion promoters selected from the group consisting of

[i] bis[3-(trialkoxysilyl)alkyl]hydromuconate;

(ii) bis[3-(trialkoxysilyl)alkyl]succinate;

(iii) bis[3-(trialkoxysilyl)alkyl]phthalate; and (v) bis[3-(trialkoxysilyl)alkyl]pyridine-2,6 dicarboxylate.

wherein the alkyl radicals has from 1 to 8 carbon atoms.

Desirable adhesion promoters are adhesion promoters selected from the group consisting of [i] bis[3-(trialkoxysilyl)alkyl] hydromuconate; (ii) bis[3-(trialkoxysilyl)alkyl] succinate; (iii) bis[3-(trialkoxysilyl)alkyl] phthalate; and (v) bis[3-(trialkoxysilyl)alkyl] pyridine-2,6 dicarboxylate, wherein the alkyl radical contains 1 to about 4 carbon atoms; most preferably the alkyl radical is propyl.

Preferred are those where the alkoxy is methoxy and the alkyl is propyl. Especially preferred is the embodiment where the alkoxy is methoxy, the alkyl is propyl and the salt is succinate.

In an embodiment of the present invention the wipe solvent/coupling agent composition is applied directly to the substrate surface being coupled, such as aluminum. In cases where the aluminum surface is oxidized, Alodined or anodized, the surface is lightly treated with an abrasive pad such as Scotch-Britew™ No. 7447 pad (silicon carbide/aluminum oxide) to remove the oxide, Alodine or anodized layer, or is soaked in an alcoholic phosphoric acid bath for about 10 minutes to etch away the oxidized layer and rinsed in water to remove all traces of the bath, or is deoxidized according to other standard methods of deoxidation.

In the preferred processes of the present invention, the substrate is surface-prepared in a series of sequential steps in which it is first degreased if necessary, such as by cleaning with acid, alkali or solvent wipe, rinsed and then deoxidized. The substrate, after rinsing as appropriate, is then wiped with the novel wipe solvent composition of the present invention, containing a polyfunctional coupling agent and an adhesion promotor, and is then coated. No priming is necessary.

The following comparative tests demonstrate the improvement in bonding of coatings to various substrates as measured by adhesion tests on the compositions containing adhesion promotor.

Aluminum, plastic or composite test specimens are first deoxidized or abraded, prior to being manufactured into lap shear specimens in accordance with ASTM D 1002.

The aluminum, plastic or composite lap shear specimens are then coated by the application of the environmental wipe solvents and then are dry wiped with a clean dry rag to remove contamination such as oil, grease, metallic or plastic particles. They are then exposed to air for a period of one hour to 24 hours, after which the cleaned specimens are subjected silicone bonding which is followed by testing in accordance with ASTM D 1002 titled “Strength Properties of Adhesives in Shear by Tension Loading Metal to Metal”.

The purpose of the lap shear testing is to determine and establish the type of delamination failure. Delaminated coupons showing cohesive failures are considered excellent; while any coupons showing adhesive failure were considered poor.

In each test the result is a representation of at least three lap shear specimens.

The following table is a record of the expected results from the application of adhesion promoter cleaned specimens with silicone curing formulations.

| Substrate | Fumarate | Succinate | Hydromuconate | 630/w primer | 866 w/primer |
|---|---|---|---|---|---|
| Bare Aluminum | E | E | P | E | E |
| Alclad Aluminum | E | E | E | E | E |
| Aluminum Phosphoric AA | | E | | E | E |
| Aluminum - Sol Gel coated | | E | E | E | E |
| ABS Plastic | | P | | E | E |
| Sabot [Ultem carbon reinforced | E | E | E | P | P |
| Diallylphthalate | | E | | | |
| Epoxy Glass Laminate | | E | E | E | E |
| Epoxy/Graphite | | E | | E | E |
| Humiseal 2A53 | E | E | E | E | P |
| Humiseal coated Sabot | E | E | E | P | P |
| Loctite 362 Acrylic | E | E | E | E | E |
| Mylar | E | E | E | | |
| Nylon | E | P | P | P | P |
| Corona treated Nylon | E | P | P | P | P |

E = excellent - cohesive failure
P = poor - adhesive failure

Many variations of the present invention will suggest themselves to those skilled in this art in light of the above, detailed description. All such obvious variations are within the full intended scope of the appended claims.

What is claimed is:

1. A wipe solvent composition for cleaning and priming a substrate and for depositing on the substrate a residue comprising a polyfunctional coupling agent and an adhesion promoter, said composition comprising:

a] 95 to 99.9% by volume of an environmentally-acceptable volatile organic solvent having a composite vapor pressure below about 45 mm Hg;

b] 0.1 to 5%, by volume of 3-glycidoxypropyltrimethoxy silane polyfunctional coupling agent; and c] 0.1 to 5%, by volume of an adhesion promoting agent selected from the group consisting of [i] bis[3-(trialkoxysilyl)alkyl] hydromuconate; (ii) bis[3-(trialkoxysilyl)alkyl] succinate; (iii) bis[3-(trialkoxysilyl)alkyl] phthalate; and (v) bis[3-(trialkoxysilyl)alkyl] pyridine-2,6 dicarboxylate, wherein the alkyl radicals contain from 1 to about 8 carbon atoms.

2. A wipe solvent composition according to claim 1 where the solvent comprises naphtha.

3. A wipe solvent composition according to claim 1 in which the volatile organic solvent comprises a mixture of naphtha and methyl propyl ketone.

4. A wipe solvent composition according to claim 1 where the solvent is methyl propyl ketone.

5. The wipe solvent composition of claim 1 wherein the alkoxy radical is methoxy.

6. The wipe solvent composition of claim 1 wherein the alkyl radical contains from 1 to 4 carbon atoms.

7. The wipe solvent composition of claim 6 wherein the alkyl radical is propyl.

8. The wipe solvent composition of claim 7 wherein the alkoxy radical is methoxy.

9. The wipe solvent composition of claim 1 wherein the adhesion promoting agent is [bis[3-(trialkoxysilyl)alkyl] succinate.

* * * * *